US011809785B2

(12) United States Patent
Saitou

(10) Patent No.: US 11,809,785 B2
(45) Date of Patent: Nov. 7, 2023

(54) SUPPORT APPARATUS THAT SUPPORTS DESIGN ON THE BASIS OF PERFORMANCE INFORMATION

(71) Applicant: FANUC CORPORATION, Yamanashi (JP)

(72) Inventor: Kiwamu Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 273 days.

(21) Appl. No.: 16/598,164

(22) Filed: Oct. 10, 2019

(65) Prior Publication Data

US 2020/0151285 A1 May 14, 2020

(30) Foreign Application Priority Data

Nov. 9, 2018 (JP) ................................ 2018-211661

(51) Int. Cl.
*G06F 30/00* (2020.01)
*G06F 30/20* (2020.01)

(52) U.S. Cl.
CPC .............. *G06F 30/00* (2020.01); *G06F 30/20* (2020.01)

(58) Field of Classification Search
CPC ...... G06F 30/00; G06F 30/20; G06F 2119/18; G06F 2119/20; Y02P 90/02; G05B 19/4097; G05B 2219/32153
See application file for complete search history.

(56) References Cited

U.S. PATENT DOCUMENTS 5,369,870 A * 12/1994 Ouchi ................ G05B 19/4097 29/558
5,815,400 A * 9/1998 Hirai ................ G05B 19/41875 700/173

(Continued)

FOREIGN PATENT DOCUMENTS

CN 107957707 A 4/2018
JP H5-282331 A 10/1993

(Continued)

OTHER PUBLICATIONS

Bang, Chaewon. Hybrid integration-approach for process planning and shop floor scheduling in agile manufacturing. State University of New York at Buffalo, 2003, 266 pages (Year: 2003).*

(Continued)

*Primary Examiner* — Eunhee Kim
(74) *Attorney, Agent, or Firm* — HAUPTMAN HAM, LLP

(57) ABSTRACT

A design support apparatus stores performance information of past processing of a workpiece, design information of a current workpiece, and allowance information including allowable shape information by which a change in dimension is permitted to a design shape. The respective information are stored for each element of the workpiece. The design support apparatus includes an extraction unit extracting the performance information including a shape of an element similar to a design shape of an element of the current workpiece. The design support apparatus includes an evaluation unit evaluating a processing technique of the elements included in the performance information. The design support apparatus includes a shape setting unit setting a shape of the element based on the processing technique selected by the evaluation unit and an allowable shape.

6 Claims, 16 Drawing Sheets

(56) References Cited

U.S. PATENT DOCUMENTS

| | | | | |
|---|---|---|---|---|
| 5,917,726 | A * | 6/1999 | Pryor | G05B 19/41875 700/95 |
| 8,428,765 | B2 * | 4/2013 | Okita | G05B 19/40938 700/179 |
| 9,618,926 | B1 * | 4/2017 | Louette | G05B 19/18 |
| 10,195,708 | B2 * | 2/2019 | Agudelo | G05B 19/4065 |
| 10,606,245 | B2 * | 3/2020 | Gifford | G05B 19/41805 |
| 2003/0130758 | A1 * | 7/2003 | Hirano | G05B 19/4097 700/182 |
| 2006/0161290 | A1 * | 7/2006 | Takahashi | G05B 19/40937 700/182 |
| 2008/0033592 | A1 * | 2/2008 | Okrongli | G05B 19/4083 700/179 |
| 2015/0142154 | A1 * | 5/2015 | Tiano | G05B 19/4065 700/109 |
| 2017/0300037 | A1 * | 10/2017 | Platts | G06Q 50/04 |
| 2017/0308057 | A1 * | 10/2017 | Kreidler | G05B 19/41875 |
| 2018/0107197 | A1 * | 4/2018 | Tanaka | G05B 19/4097 |
| 2018/0259935 | A1 * | 9/2018 | Saitou | G05B 19/4097 |
| 2018/0275634 | A1 * | 9/2018 | McFarland | G05B 19/4099 |
| 2018/0373226 | A1 * | 12/2018 | Ootomo | G05B 19/4097 |
| 2019/0030582 | A1 * | 1/2019 | Olsson | B23K 15/0046 |

FOREIGN PATENT DOCUMENTS

| | | | |
|---|---|---|---|
| JP | H9-160959 | A | 6/1997 |
| JP | 2002-304203 | A | 10/2002 |
| JP | 2005-25569 | A | 1/2005 |
| JP | 2005-222242 | A | 8/2005 |
| JP | 2007-257621 | A | 10/2007 |
| JP | 2011-257915 | A | 12/2011 |
| JP | 2016536672 | A | 11/2016 |
| JP | 201721657 | A | 1/2017 |
| JP | 201863653 | A | 4/2018 |

OTHER PUBLICATIONS

Urbanic, R. J., and R. W. Hedrick. "A matrix-based framework for assessing machine tool reconfiguration alternatives." The International Journal of Advanced Manufacturing Technology 81, No. 9 (2015): 1893-1919 (Year: 2015).*

Abdi, M. Reza, Ashraf W. Labib, Farideh Delavari Edalat, and Alireza ABDi. "Evaluation of Reconfigurable Machines Using FAHP." In Integrated Reconfigurable Manufacturing Systems and Smart Value Chain, pp. 167-196. Springer, Cham, 2018 (Year: 2018).*

Azab, A., Hoda A. Elmaraghy, and S. N. Samy. "Reconfiguring process plans: a new approach to minimize change." In Changeable and reconfigurable manufacturing systems, pp. 179-194. Springer, London, 2009 (Year: 2009).*

Maganha, Isabela, Cristovao Silva, and Luis Miguel DF Ferreira. "The layout design in reconfigurable manufacturing systems: a literature review." The International Journal of Advanced Manufacturing Technology 105, No. 1 (2019): 683-700 (Year: 2019).*

Suh, Suk-Hwan, Jung-Hoon Cho, and Hee-Dong Hong. "On the architecture of intelligent STEP-compliant CNC." International Journal of Computer Integrated Manufacturing 15, No. 2 (2002): 168-177 (Year: 2002).*

* cited by examiner

FIG. 5

INFORMATION OF WORKPIECE SHAPE AND MATERIAL

| SHAPE TYPE: RECTANGULAR RECESS | DESIGN DIMENSION AND SURFACE ROUGHNESS |
|---|---|
| MATERIAL: S45C<br><br>DIMENSION OF RECESS<br>WIDTH: 50 mm<br>LENGTH: 100 mm<br>DEPTH: 30 mm<br>CORNER R: 10 mm<br>BOTTOM R: 10 mm<br><br>DIMENSIONS OF PERIPHERY<br>WALL THICKNESS: 5 mm<br>BOTTOM THICKNESS: 5 mm<br><br>TOLERANCE: ±0.1 mm<br><br>SURFACE ROUGHNESS<br>INSIDE: REGULAR FINISH | 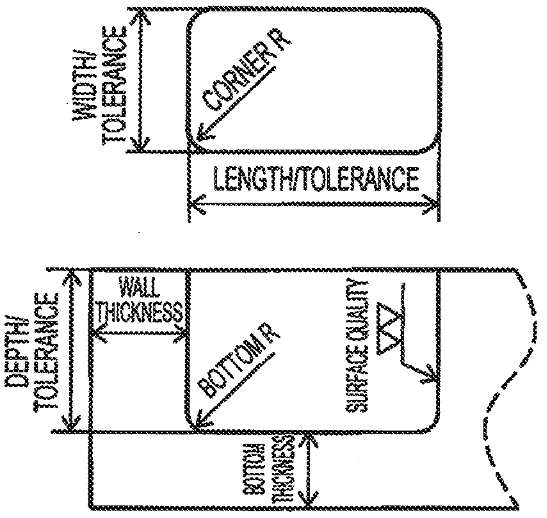 |

FIG. 6

PROCESSING TECHNIQUE INFORMATION

FIRST STEP

PROCESSING METHOD: MILLING

MACHINE: VERTICAL MACHINE TOOL MS01

TOOL: END MILL (DIAMETER 8.0 mm)

CUTTING EDGE R 0.2 mm

PROCESSING CONDITIONS: FEED SPEED 1500 mm/min, TOOL ROTATION SPEED 4000 rpm

CUTTING AMOUNT (AXIAL DIRECTION) 4.0 mm

CUTTING AMOUNT (RADIAL DIRECTION) 2.0 mm

USE OF COOLANT

SECOND STEP

PROCESSING METHOD: MILLING

MACHINE: VERTICAL MACHINE TOOL MS01

TOOL: END MILL (DIAMETER 6.0 mm)

CUTTING EDGE R 0.1 mm

PROCESSING CONDITIONS: FEED SPEED 800 mm/min, TOOL ROTATION SPEED 4800 rpm

CUTTING AMOUNT (AXIAL DIRECTION) 0.3 mm

CUTTING AMOUNT (RADIAL DIRECTION) 0.3 mm

USE OF COOLANT

PROCESSING RESULT INFORMATION

FIG. 10

ALLOWANCE INFORMATION

| SHAPE TYPE: RECTANGULAR RECESS | ALLOWABLE RANGE |
|---|---|
| MATERIAL: S45C<br><br>DIMENSION OF RECESS<br>WIDTH: NOT CHANGEABLE<br>LENGTH: NOT CHANGEABLE<br>DEPTH: NOT CHANGEABLE<br>CORNER R: 0 mm TO 10 mm<br>BOTTOM R: 0 mm TO 10 mm<br><br>DIMENSIONS OF PERIPHERY<br>WALL THICKNESS: NOT CHANGEABLE<br>BOTTOM THICKNESS: NOT CHANGEABLE<br><br>TOLERANCE: ±0.1 mm | 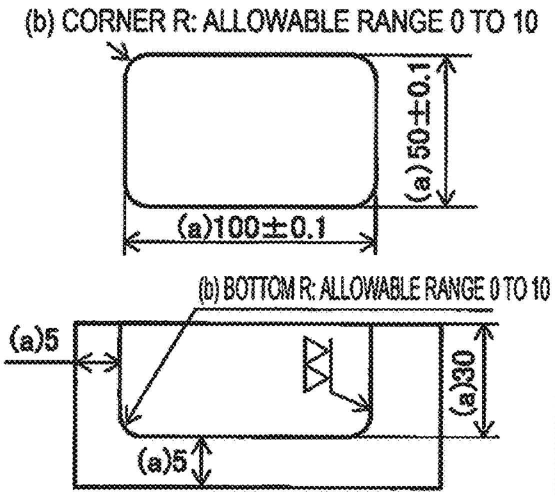<br>(a): DIMENSIONS NOT TO BE CHANGED<br>(b): DIMENSIONS CHANGEABLE |

SUPPORT APPARATUS THAT SUPPORTS DESIGN ON THE BASIS OF PERFORMANCE INFORMATION

RELATED APPLICATIONS

The present application claims priority of Japanese Application Number 2018-211661, filed Nov. 9, 2018, the disclosure of which is hereby incorporated by reference herein in its entirety.

BACKGROUND OF THE INVENTION

1. Field of the Invention

The present invention relates to a design support apparatus that supports design on the basis of performance information.

2. Description of the Related Art

An operator can design an arbitrary shape of a workpiece by using a Computer Aided Design (CAD) device or the like. The workpiece can be processed on the basis of a workpiece shape designed by the operator. When a workpiece is processed, an appropriate method can be selected from methods such as cutting and drilling. Moreover, when a workpiece is processed, a machine such as a machine tool is selected according to the shape and the material of the workpiece.

Depending on the processing method and the machine selected by the operator, the processing time, processing cost, and quality of the workpiece when processing the workpiece may vary. The processing time is preferably short, the processing cost is preferably low, and the quality is preferably high.

In the related art, there exists a known apparatus for extracting a shape, a material, or the like of a workpiece on the basis of three-dimensional data output by a CAD device and calculating the processing cost of the workpiece (e.g., see Japanese Laid-open Patent Publication No. 05-282331A and Japanese Laid-open Patent Publication No. 2005-222242A). Alternatively, there exists a known system for evaluating the material of a workpiece, a manufacturing condition, a method of disposal, or the like, when manufacturing a product (e.g., see Japanese Laid-open Patent Publication No. 09-160959A and Japanese Laid-open Patent Publication No. 2007-257621A).

In addition, a system is known in which an operator changes the order of manufacturing processes by detecting similar performance data from data of the type of processing or the shape and seeing results of similar processing performance (e.g., see Japanese Laid-open Patent Publication No. 2005-25569A). Furthermore, as for numerically controlled machine tools, there exists a known apparatus that automatically generates a tool path for a workpiece on the basis of three-dimensional data output by a CAD device (e.g., see Japanese Laid-open Patent Publication No. 2002-304203A).

SUMMARY OF THE INVENTION

An operator can set an arbitrary dimension from experience or the like when a workpiece is designed by a CAD device or the like. Here, the dimensions of the workpiece, even though not important for the function of the product, may greatly affect the processing time or processing cost.

For example, when a recess is formed in a workpiece, a machine tool provided with an end mill can be used. When a corner of the recess is formed, processing for cutting the workpiece is performed while rotating the end mill. In this case, an end mill having a tool radius smaller than the radius of curvature of the corner of the recess is required. Generally, the smaller the tool diameter, the smaller the cutting amount per unit time, and the longer the processing time. For this reason, when an operator sets the curvature radius of a corner to small value, the processing time will increase. However, the radius of curvature of the corner of the recess may not be important for the function or appearance of the product.

When the experience of the operator is poor, it may be difficult for the operator to determine whether the design shape is optimal. Alternatively, the operator may set the quality higher than the quality required for the function of the product. For example, a surface roughness of a workpiece may be set finer than the necessary roughness. Furthermore, when there are multiple types of machines, it may be difficult for an operator to determine the shape that each machine can process. Alternatively, it may be difficult to determine whether a machine selected by an operator is suitable for the shape of the workpiece.

In the related art, there exists an apparatus in which a tool path of a machine tool is generated according to the shape of a workpiece when the shape of the workpiece is changed in a CAD device. However, in this apparatus, the tool path is only generated on the basis of a predetermined rule and three-dimensional data. There is the problem that this apparatus cannot evaluate the shape of the workpiece or the machine used for processing the workpiece.

A design support apparatus according to an aspect of the present disclosure includes a performance information storage unit that stores performance information of past processing of a workpiece, and a design information storage unit that stores design information including a design shape of a current workpiece. The design support apparatus includes an allowance information storage unit that stores allowance information including information of an allowable shape by which a change in dimension is permitted to a design shape. The design support apparatus includes an extraction unit configured to extract the performance information, an evaluation unit configured to evaluate information included in the performance information, and a shape setting unit configured to set a shape of an element of a workpiece in which the design shape is changed. The performance information includes information of a shape and a material of the workpiece, processing technique information including a type of a machine to have processed the workpiece, and processing result information. The performance information is stored in the performance information storage unit for each element of the workpiece. The extraction unit extracts performance information including a shape of an element similar to a design shape of the element of the current workpiece and a material similar to the material of the current workpiece. The evaluation unit evaluates a processing technique of an element included in the performance information extracted by the extraction unit on the basis of a processing result, and selects a processing technique on the basis of an evaluation result. The shape setting unit sets the shape of the element on the basis of the processing technique selected by the evaluation unit and the allowable shape.

BRIEF DESCRIPTION OF THE DRAWINGS

FIG. 5 is an example of information, among performance information, of the shape and material of a workpiece.

FIG. 6 is an example of processing technique information among performance information.

FIG. 10 is an example of allowance information in an embodiment.

DETAILED DESCRIPTION

A design support apparatus according to an embodiment will be described with reference to FIGS. 1 to 20. The design support apparatus according to the present embodiment can support selection of a machine for processing or setting of a shape of a workpiece on the basis of past performance information.

Figure 1:
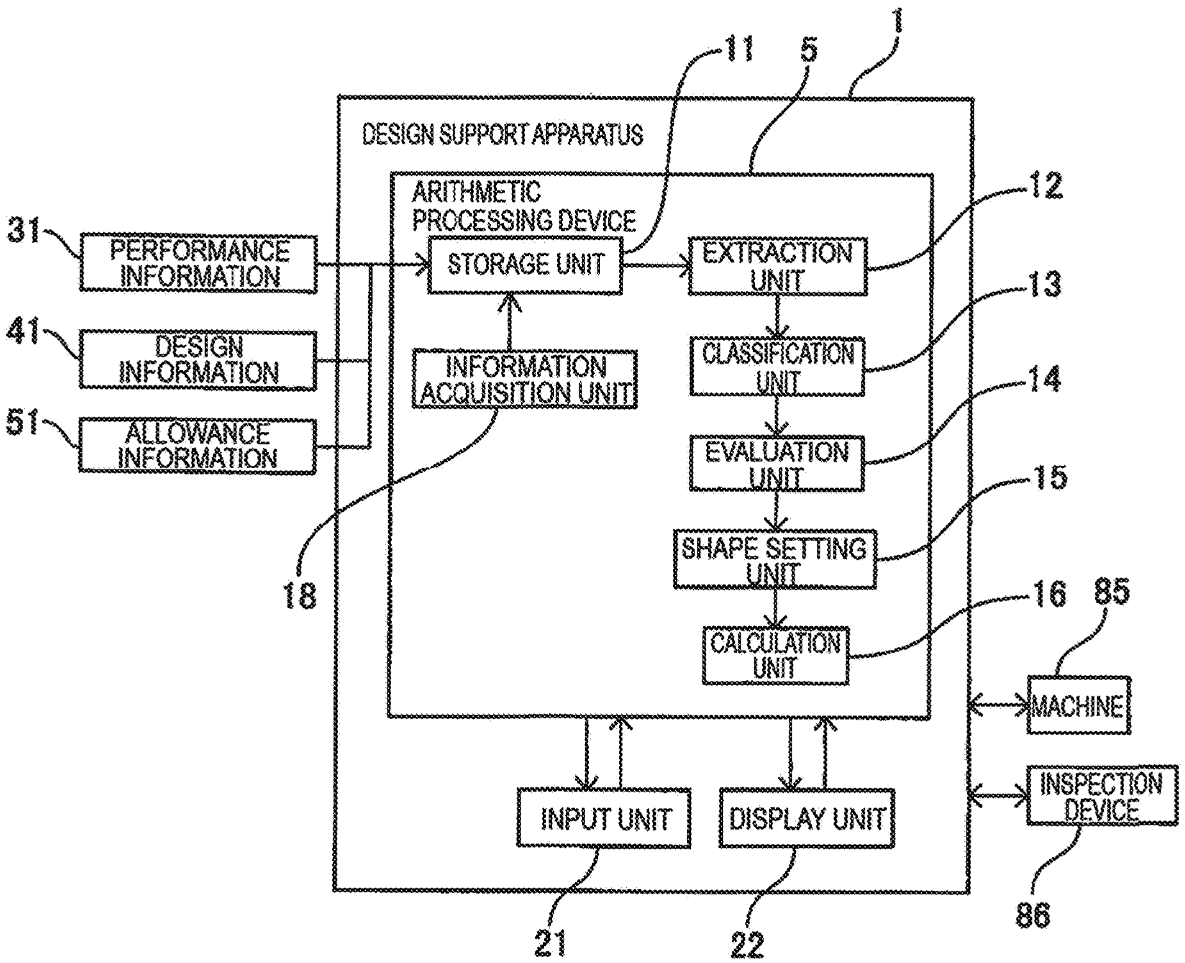
FIG. 1 is a block diagram of a first design support apparatus in an embodiment.

FIG. 1 is a block diagram of a first design support apparatus in an embodiment. A first design support apparatus 1 includes an arithmetic processing device 5 as a computer. The arithmetic processing device 5 includes a Central Processing Unit (CPU) as a processor. The arithmetic processing device 5 includes a Random Access Memory (RAM), a Read Only Memory (ROM), or the like connected to the CPU via a bus. The arithmetic processing device 5 processes information according to an operation program created in advance.

The design support apparatus 1 includes an input unit 21 for an operator to input desired information. The input unit 21 includes a keyboard or the like. The operator can input information related to the processing of the workpiece via the input unit 21. The design support apparatus 1 includes a display unit 22 that displays information related to design support. The display unit 22 includes a liquid crystal display panel or the like. In addition, the display unit 22 displays information related to processing of the workpiece. A touch panel type display allowing input of information and display of information may be employed as the input unit 21 and the display unit 22.

The arithmetic processing device 5 includes a storage unit 11 configured to store information related to the support of the design of the workpiece. The storage unit 11 can be configured by a storage medium capable of storing information, such as a volatile memory, a non-volatile memory, or a hard disk. The processor of the arithmetic processing device 5 is formed to be able to read the information stored in the storage unit 11. Performance information 31, which is information of past processing of a workpiece, is input to the arithmetic processing device 5. In the present embodiment, a plurality of pieces of performance information 31 are stored for each element (portion to be processed) of the workpiece, as will be described later. The storage unit 11 functions as a performance information storage unit configured to store the performance information 31.

Design information 41 including a design shape of a workpiece for processing a current workpiece is input to the arithmetic processing device 5. The storage unit 11 functions as a design information storage unit configured to store the design information 41. Furthermore, in order to optimize the shape of the workpiece, allowance information including information on an allowable shape of the workpiece is input to the arithmetic processing device 5. The allowable shape is a shape by which a change in dimension is permitted to the design shape. The storage unit 11 functions as an allowance information storage unit configured to store allowance information.

The arithmetic processing device 5 includes an extraction unit 12 configured to extract at least one piece of performance information 31 from the performance information 31 of the plurality of elements. The extraction unit 12 extracts the performance information 31 that includes a shape similar to the design shape of the element of the current workpiece and a material similar to the material of the current workpiece. The arithmetic processing device 5 includes a classification unit 13 configured to classify the performance information 31 extracted by the extraction unit 12 for each processing technique. The arithmetic processing device 5 includes an evaluation unit 14 configured to evaluate information included in the performance information. The evaluation unit 14 evaluates the processing technique classified by the classification unit 13 on the basis of the processing result. The evaluation unit 14 selects a processing technique on the basis of the result of the evaluation. For example, the evaluation unit 14 selects one or more appropriate processing techniques.

The arithmetic processing device 5 includes a shape setting unit 15 configured to set the shape of the element of the workpiece for which a design shape has been changed. The shape setting unit 15 sets the shape of the element on the basis of the processing technique selected by the evaluation unit 14, and the allowable shape. The arithmetic processing device 5 includes a calculation unit 16 configured to calculate at least one of processing time and processing cost on the basis of the processing technique selected by the evaluation unit 14.

Each of the extraction unit 12, the classification unit 13, the evaluation unit 14, the shape setting unit 15, the calculation unit 16, and an information acquisition unit 18 described later corresponds to a processor driven according to the operation program. The processor functions as each unit by reading the operation program and performing control defined in the operation program.

The arithmetic processing device 5 in the present embodiment can select a preferred processing technique on the basis of a plurality pieces of past performance information 31 and can further propose a change in design shape. The shape of the workpiece set by the shape setting unit 15 and the processing time calculated by the calculation unit 16 or the like are displayed on the display unit 22. The operator can easily determine whether the present design is preferable.

Figure 2:
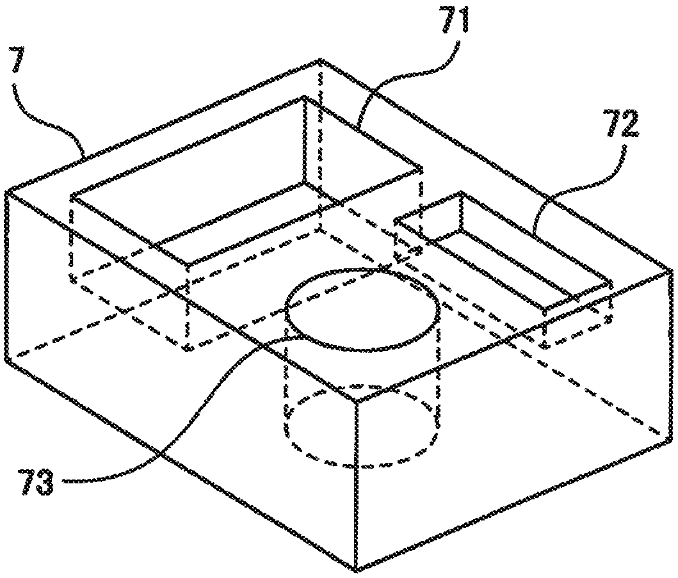
FIG. 2 is a perspective view of a first workpiece in an embodiment.

Next, a first design support apparatus 1 will be described in detail by taking a workpiece as an example. FIG. 2 is a perspective view of a first workpiece in the present embodiment. FIG. 2 illustrates a workpiece 7 after processing. The upper surface of the workpiece 7 is formed with a first recess 71 and a second recess 72 that have a bottom surface. Recesses 71 and 72 have a rectangular planar shape. Further, in the workpiece 7, a hole 73 penetrating from the upper surface to the lower surface is formed. The hole 73 has a circular planar shape. Recesses 71 and 72 have different planar shapes from each other. The recess 71 and the recess 72 have different depths. Thus, the first recess 71 has a shape different from that of the second recess 72.

When the workpiece 7 is formed, a machine tool capable of changing the relative position of the tool to the workpiece can be used. The machine tool first forms a square pole shaped workpiece having a predetermined size by cutting the upper surface and the side surface of the workpiece 7 by using a face mill or an end mill as a tool. Next, a hole is formed by using a drill as a tool. Next, the first recess 71 and the second recess 72 can be formed by using an end mill as a tool.

Next, in order to support the design of the first workpiece 7, the performance information 31, the design information 41, and allowance information 51 stored in the storage unit 11 will be described. These pieces of information can be stored in a data file in any format.

Figure 3:
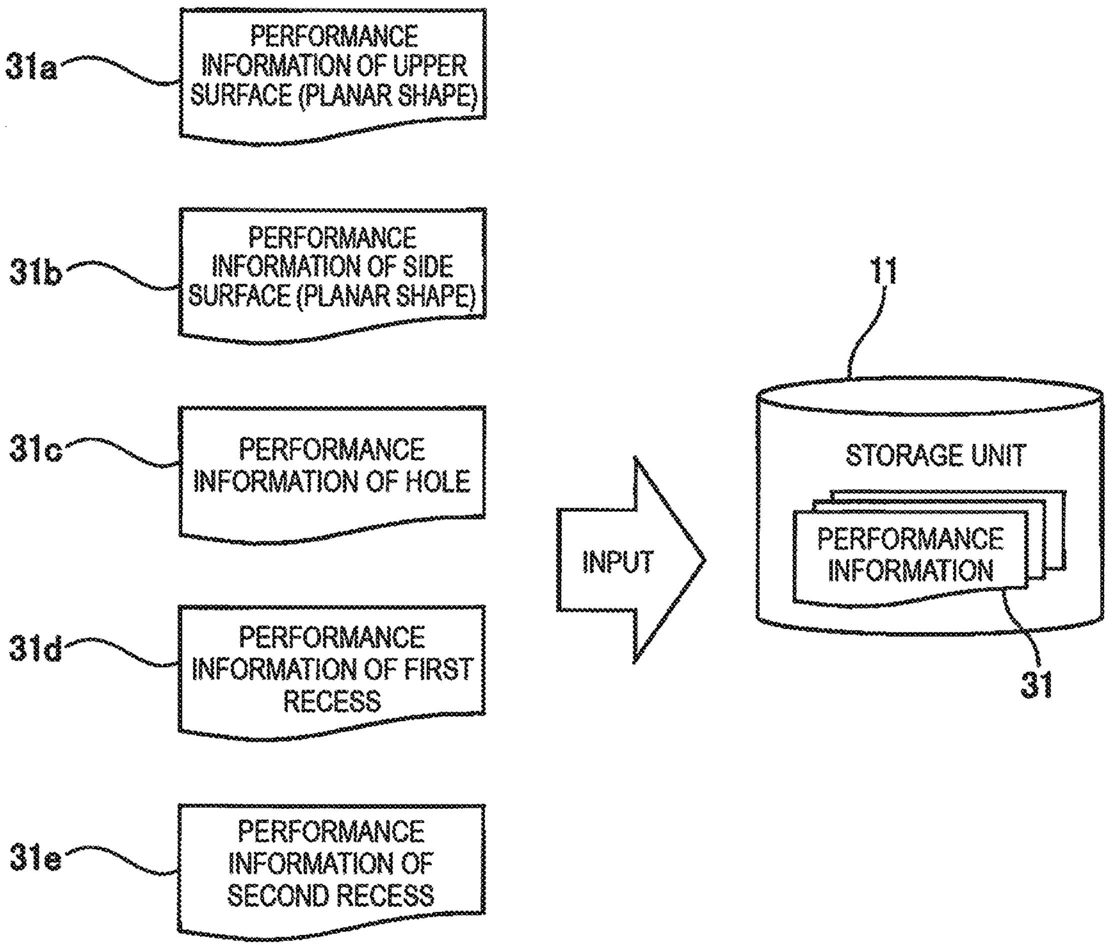
FIG. 3 is an explanatory diagram of a method for storing performance information in an embodiment.

FIG. 3 is an explanatory diagram of a method of storing performance information in the present embodiment. The performance information 31 in the present embodiment is stored for each element (portion to be processed) of the workpiece. When a plurality of processes are performed on one workpiece, performance information is generated and stored in the storage unit 11 for each portion of the workpiece processed. For example, in a case where the workpiece illustrated in FIG. 2 is formed in the past, performance information 31*a* of cutting the upper surface of the workpiece 7 and performance information 31*b* of cutting the side surface of the workpiece 7 are generated. Further, performance information 31*c* of forming the hole 73, performance information 31*d* of forming the first recess 71, and performance information 31*e* of forming the second recess 72 are generated. The pieces of performance information 31*a* to 31*d* for each element of the workpiece are individually stored in the storage unit 11. The design support apparatus 1 of the present embodiment supports design for each element of a workpiece on the basis of the performance information 31*a* to 31*e* stored for each element.

Figure 4:
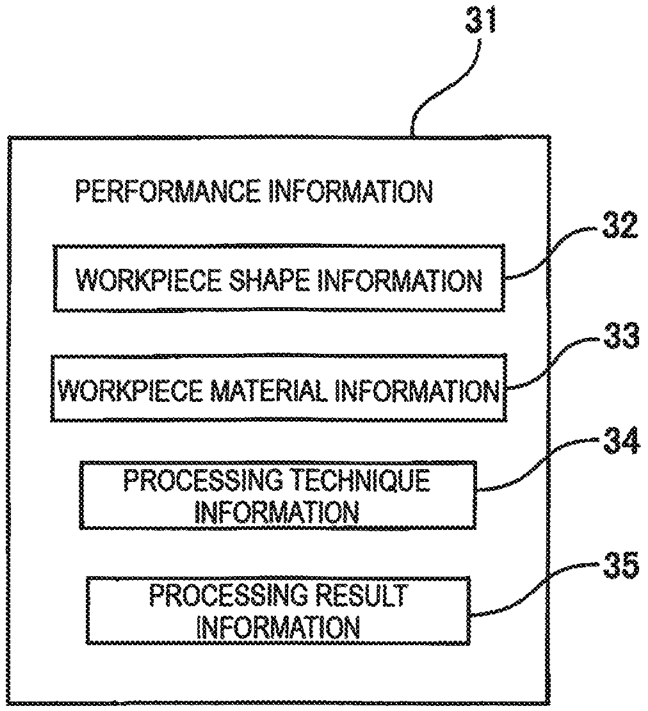
FIG. 4 is an explanatory diagram of information included in performance information.

FIG. 4 is an explanatory diagram of performance information in the present embodiment. The performance information 31 of the present embodiment includes workpiece shape information 32 and workpiece material information 33. Additionally, the performance information 31 includes processing technique information 34 and processing result information 35. The processing technique information 34 is information such as the type of the machine that processed the workpiece as described later. The design information of a past processing can be employed as the workpiece shape information 32, the workpiece material information 33, and the processing technique information 34. The information of the inspection result of the workpiece carried out after the past processing can be employed as the processing result information 35.

FIG. 5 illustrates an example of the workpiece shape information and the workpiece material information in the present embodiment. The workpiece shape information and the workpiece material information in the present embodiment are formed for each element. In FIG. 5, information related to the recess 71 of the workpiece 7 formed in the past is illustrated. Referring to FIGS. 4 and 5, the workpiece shape information 32 includes design information when the workpiece is designed. The workpiece shape information 32 includes the type of element shape. The type of element shape includes information that the processed shape is a plane, a curved surface, a recess, a protrusion, or a hole, or the like. Also, information of a cross-sectional shape is included in the type of shape. For example, the information includes that the cross-sectional shape is a circle, a square, or a shape surrounded by a free curve. In the example illustrated in FIG. 5, the type of shape is a recess having a square cross-sectional shape.

The workpiece shape information 32 includes the design shape information. That is, the workpiece shape information 32 includes information of the dimensions of the element. The information of the dimensions includes all dimensions for defining the shape of the element. In the example illustrated in FIG. 5, the dimensions of the recess include the width, the length, the depth, the radius of curvature of the corner of the recess in plan view, and the radius of curvature of the corner of the recess in the cross-sectional shape. Here, in the case of the hole 73 in FIG. 2, the dimensional information includes the diameter of the hole and the depth of the hole. Also, in the case of a hole having a conical bottom in cross-sectional shape, the dimensional information includes the inclination angle of the bottom or the like.

The workpiece shape information 32 includes information of the dimensions of the periphery of the element. For example, in the example illustrated in FIG. 5, a thickness of a bottom of the workpiece in an area where the recess is formed, and a thickness of a side wall of the recess are included. In the case of the hole 73 illustrated in FIG. 2, the thickness from a wall surface of the hole 73 to a side surface of the workpiece 7 is included.

The workpiece shape information 32 includes workpiece quality information. For example, the workpiece quality information includes tolerances set in the respective dimensions. Also, the quality information includes the surface roughness set on the surface to be processed. In the case of the hole 73 illustrated in FIG. 2, the quality information includes the perpendicularity of the hole or the like in addition to the tolerance and the surface roughness.

The workpiece material information 33 includes information on the classification of the workpiece material. For example, the material information 33 includes the name of a material such as steel, stainless steel, or aluminum. Alternatively, the material information 33 includes a classification of a predetermined standard. In the example illustrated in FIG. 5, information that is S45C, which is one of carbon steel, is included by using Japanese Industrial Standards (JIS standards).

Alternatively, the material information 33 may include information on physical properties of the material. For example, information on physical properties such as Young's modulus, toughness, melting point, or electrical conductivity of the material to be processed may be included.

FIG. 6 illustrates an example of processing technique information. Processing technique information is also created for each element. Referring to FIGS. 4 and 6, a plurality of steps may be included in processing of a workpiece. In the case of processing in a plurality of steps, information in which the processing techniques of the respective steps are arranged in the order of execution is generated as the processing technique information. For example, referring to FIG. 2, when the recess 71 is formed, there may be a step of roughly cutting in a smaller dimension than the designed shape and a step of cutting to the dimension of the designed shape. In this case, two steps are stored in order. The processing technique information 34 illustrated in FIG. 6 includes the information on the first step and the information on the second step.

The processing technique information 34 includes the type of processing method actually used. For example, information such as cutting, turning, electrical discharge machining, laser processing, or press processing is included. Further, the type of processing method includes information on additive manufacturing process of laminating a resin or the like so as to form a protrusion or the like. The additive manufacturing method is a method implemented by using a three-dimensional printing machine (stereographic printer). In the example illustrated in FIG. 6, it is illustrated that cutting is performed as a processing method in both the first step and the second step.

The processing technique information 34 includes machine information and machine component information. For example, when the cutting is performed, machine tool information is included as machine information. Tool information such as an end mill is included as machine component information. When the turning is performed, the information of the lathe is included as the machine information. Tool information such as a byte is included as machine component information. When the wire electrical discharge machining is performed, information on the electrical discharge machine is included as the machine information. Information of wire for performing electrical discharge machining is included as machine component information. When the laser processing is performed, information on the laser processing machine is included as machine information. When the press working is performed, information on the press machine is included as machine information. Furthermore, when the additive manufacturing process is performed, information on a three-dimensional printing machine is included as machine information.

Machine information includes machine type and model number. The machine component information includes information such as the type, model number, and dimension of a component. In the example illustrated in FIG. 6, a vertical machine tool of model number MS01 is indicated. An end mill is indicated as the type of tool. Furthermore, the dimension of the diameter and the radius of curvature of the cutting edge for the end mill are indicated. As the component information, the material of the component may be included. The component information related to the hole 73 illustrated in FIG. 2 includes information related to a drill as a tool. When wire electrical discharge machining is performed, the component information can include information on the wire model number, the wire material, and the wire diameter.

The processing technique information 34 includes information on processing conditions. Even when the same machine and the same component are used, the method of moving the workpiece or the method of driving the component may be different. In the example illustrated in FIG. 6, the processing conditions include the feed speed of the tool with respect to the workpiece and the number of revolutions of the main spindle. Additionally, the processing conditions also include the amount of cutting of the tool with respect to the workpiece. Further, the processing conditions include information as to whether the coolant is used when cutting is performed. Furthermore, the processing conditions can include the movement direction (upcut or downcut) of the workpiece relative to the rotational direction of the tool. The processing conditions can also include information on the tool path. For example, when a plurality of cutting operations are performed along tool paths in one direction parallel to the long side of the recess, the information on the tool path can be included.

When the hole 73 illustrated in FIG. 2 is processed, the processing conditions include the feed speed of the tool, the number of rotations of the main spindle, or the like. In addition, when wire electrical discharge machining is performed, the processing conditions include the feed speed of the workpiece relative to the wire, the voltage applied to the wire, and the current supplied to the wire. Also in the wire electrical discharge machining, when there are a plurality of processing steps, machine information, component information, and processing condition information can be generated for each step.

Figure 7:
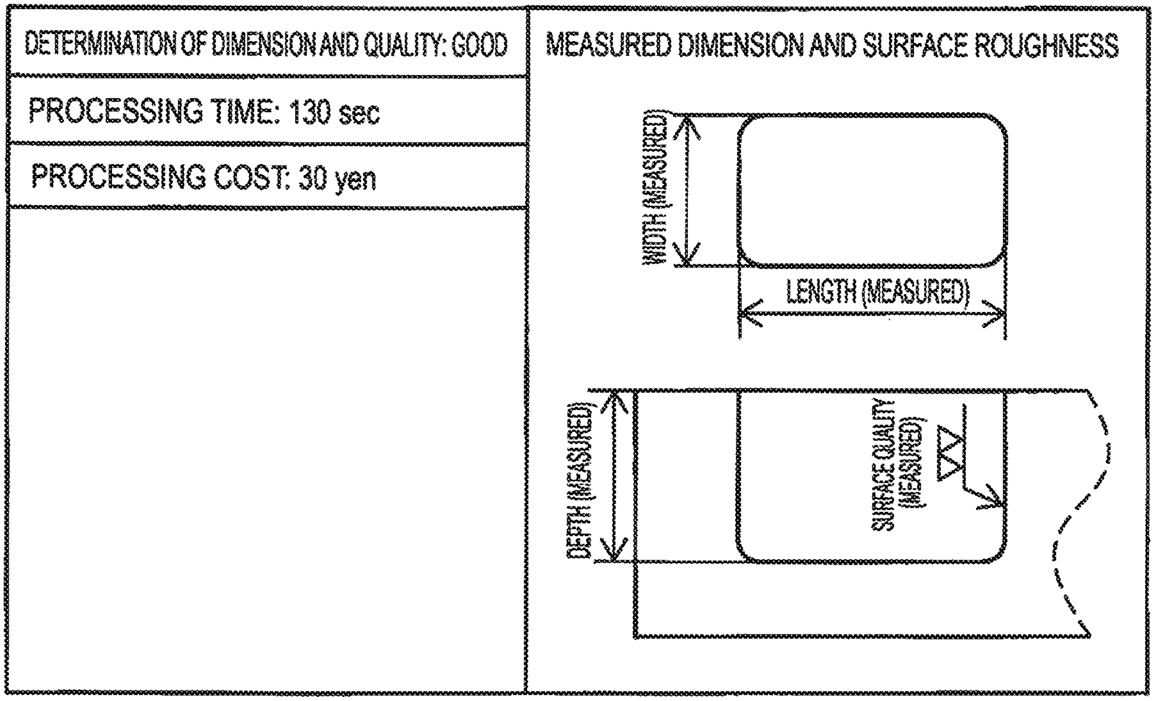
FIG. 7 is an example of processing result information among performance information.

FIG. 7 illustrates an example of processing result information. Referring to FIGS. 4 and 7, the processing result information 35 includes information on the inspection result of the processed workpiece. For example, the information on whether the dimensions of the element of the workpiece after processing are good is included. Also, information on whether the quality of the work after processing is good is included. When the dimensions or the quality such as surface roughness of the elements of the workpiece is poor, it may be preferable that the reason for the defect is included. In particular, it is preferable to include a description for portions that are defective in dimensions or quality.

As determination of the processing result of a workpiece, for example, when all the dimensions of one element are within the tolerances of the dimensions of the design shape, it is determined as good. On the other hand, when at least one dimension deviates from the range of tolerance, it is determined that the processing is defective. Furthermore, when the conditions regarding quality such as surface roughness defined at the time of design are satisfied, it is determined that the processing is good. In the example illustrated in FIG. 7, the processing is determined to be good in terms of dimensions and surface roughness.

Note that the processing result information 35 may include the value of the dimension actually inspected. Alternatively, the processing result information 35 may include information on the quality actually inspected. For example, the information on the surface roughness actually inspected may be included in the processing result information 35.

The processing result is also generated for each element in the processing result information 35. FIG. 7 illustrates the processing result of one recess. For example, in a case where the workpiece 7 illustrated in FIG. 2 is formed in the past, the processing result information is generated for each of the recess 71, the recess 72, and the hole 73. Even when a workpiece after processing is defective in a case where the workpiece contains multiple elements, in a case where the processing result of the target element is good, information is generated that the processing result of that element is good. For example, there are cases where the processing result of the workpiece is defective because the processing result of one hole is defective. Also in this case, when the processing results for the other recesses are good, it is determined that the processing results for the elements (recesses) are good.

The processing result information 35 includes the processing time required to process the element. The processing time is the actual time taken for processing the target element. When a plurality of steps are performed in order to process one element, it is preferable that the processing time be stored for each of the plurality of steps.

The processing result information 35 includes the processing cost required to process one element.

Processing costs can include the cost of electricity for driving the machine and the cost of consumable components consumed when processing is performed. For example, when cutting is performed in order to form a recess in a workpiece, the tool is included in the consumable components. In addition, consumable components of the machine are included. For example, in a machine tool, a mechanism for moving a table for fixing a workpiece may include a ball screw. In this case, the consumable components include a ball screw. The cost of the consumable components can be calculated, for example, by Equation (1) below.

(Cost of consumable component)=(Price of consumable component+replacement cost of consumable component)/(Allowable consumption amount of consumable component/Consumption amount in one processing) (1)

The operator can create and store, in the storage unit 11, the performance information 31 including the various information as described above. Additionally, the information contained in each of the workpiece shape information 32, the workpiece material information 33, the processing technique information 34, and the past result information 35 does not need to include all the information described above, but may include at least one piece of information.

Referring to FIG. 1, the design information 41 is input to the storage unit 11. The design information 41 is information related to a design for performing a current processing. The design information 41 includes information on the design shape of the workpiece to be processed this time. The design information 41 is also input for each element of the workpiece to be processed.

Figure 8:
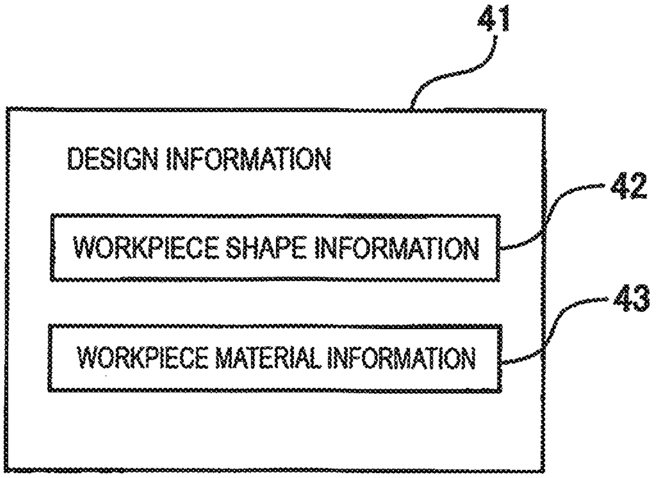
FIG. 8 is an explanatory diagram of information included in design information in an embodiment.

FIG. 8 illustrates an explanatory diagram of design information. The design information 41 includes workpiece shape information 42 and workpiece material information 43. The workpiece shape information 42 included in the design information 41 includes the same items as the workpiece shape information 32 of the performance information 31. For example, the workpiece shape information 42 includes information on the type of element shape, the dimensions of the element, and the dimensions of the periphery of the element (see FIG. 5). Further, the workpiece shape information 42 includes the workpiece quality information. For example, the workpiece shape information 42 includes tolerance information and information such as surface roughness, or the like.

The workpiece material information 43 includes the same items as the workpiece material information 33 of the performance information 31. For example, the material name of the workpiece or the classification of the standard or the like is included (see FIG. 5). Further, the design information may include three-dimensional data output from the CAD device. In addition, the design information may include information related to processing technique.

Referring to FIG. 1, the allowance information 51 is input to the storage unit 11. The allowance information 51 includes information of a portion where a change in dimension is permitted to the design shape and information of a range where the change is permitted. The operator can predetermine the allowance information 51. The allowance information 51 is also created for each element of the workpiece to be processed.

Figure 9:
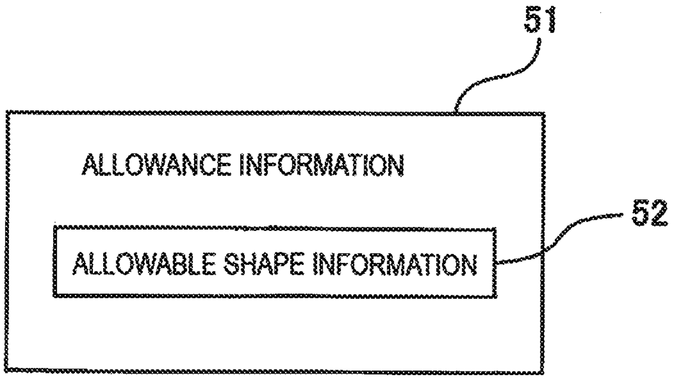
FIG. 9 is an explanatory diagram of allowance information in an embodiment.

FIG. 9 illustrates an explanatory diagram of the allowance information. FIG. 10 illustrates an example of the allowance information. Referring to FIGS. 9 and 10, the allowance information 51 includes allowable shape information 52. The allowable shape information 52 is also created for each element. In FIG. 10, allowable dimensions information of the recess 71 of the workpiece 7 is described.

The allowable shape information 52 includes information as to whether a change is permitted in each dimension of the element. In the example shown in FIG. 10, the dimension designated by the symbol a is a dimension that does not allow change. That is, the dimension designated by the symbol a is a dimension which needs to be processed with the dimension and tolerance included in the design information. Also, the dimension designated by symbol b is a dimension where the change is permitted. The allowable range is set to the dimension that allows change. This allowable range is set larger than the tolerance range.

For example, the radius of curvature of the corner when the recess 71 is viewed in plan view is specified to be a dimension that can be changed. The allowable range of the radius of curvature is set to from 0 mm to 10 mm. Also, in the cross-sectional shape of the recess, the radius of curvature of the corner is specified to a dimension that allows change. The allowable range of this radius of curvature is set to from 0 mm to 10 mm. As illustrated in FIG. 10, the allowance information may include information on the type of the element shape and information on the material. Also, with regard to the dimensions of the periphery of the element, dimensions that allow change and dimensions that do not allow change may be set.

Referring to FIG. 1, the arithmetic processing device 5 in the present embodiment can use the performance information 31, the design information 41, and the allowance information 51 so as to select a preferred processing technique and set the shape of a workpiece when processing is performed by the processing technique.

Figure 11:
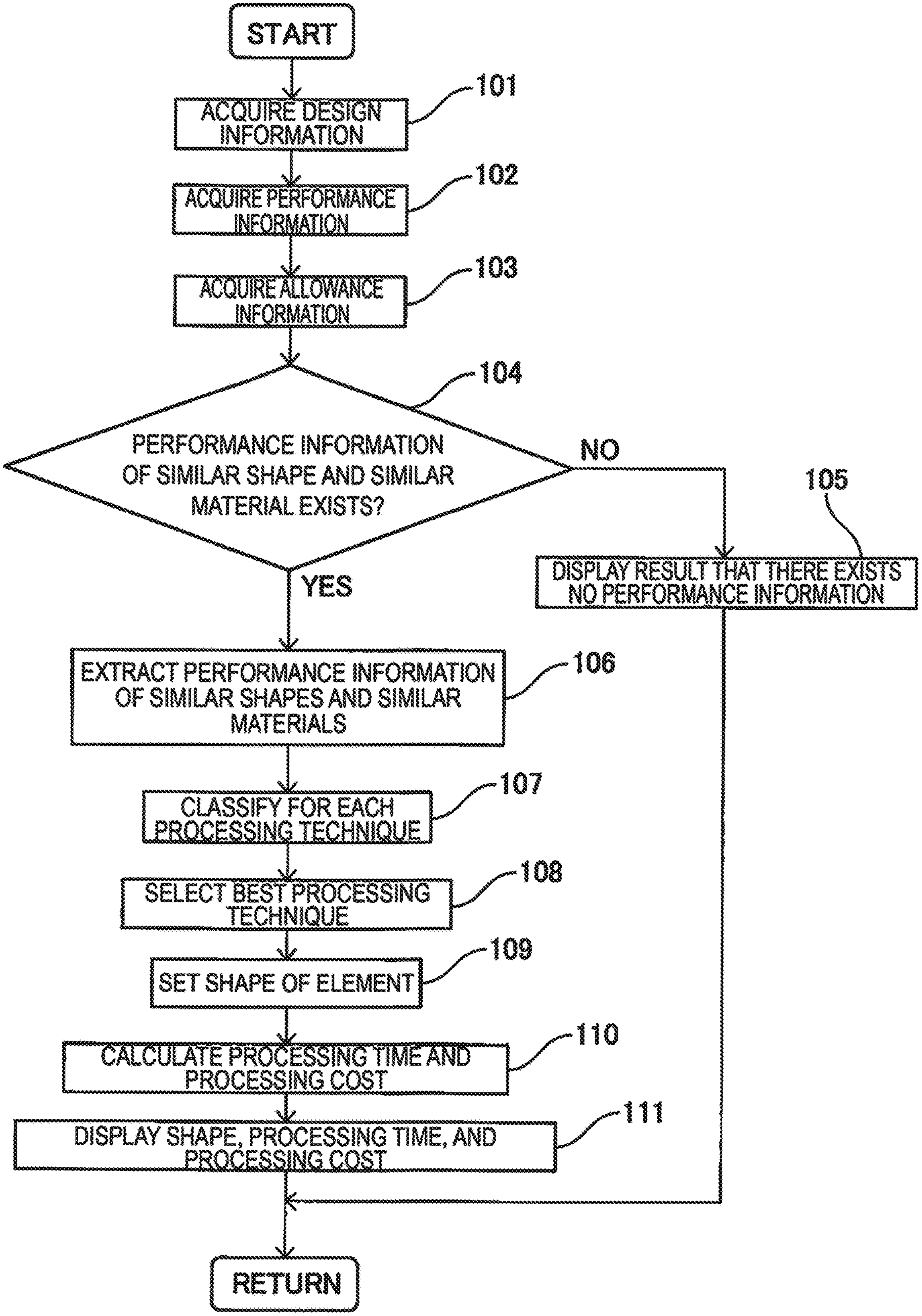
FIG. 11 is a flow chart of a first control in an embodiment.

FIG. 11 illustrates a flow chart of a first control in the present embodiment. Referring to FIGS. 1 and 11, in step 101, the extraction unit 12 acquires design information 41. In step 102, the extraction unit 12 acquires the performance information 31. In the example here, the extraction unit 12 acquires the allowance information 51 in step 103.

In step 104, the extraction unit 12 searches the performance information 31 including the workpiece that has the shape of the element similar to the shape of the element included in the design information 41 and the material similar to the material included in the design information 41. The extraction unit 12 determines whether there exists performance information having a shape similar to the shape of the current element and a material similar to the material of the current workpiece. In step 104, when, among the past performance information 31, there exists no performance information 31 including the similar shape of elements and the similar material of workpiece, the control proceeds to step 105. In step 105, the display unit 22 displays a result that there exists no performance information similar to the element to be processed this time.

In step 104, when there exists the performance information 31 including the shape of the element and the material, similar to the current processing, the control proceeds to step 106. In step 106, the extraction unit 12 extracts the performance information 31 including the similar shape and the similar material.

The determination method of the similarity of the shape of an element can be predetermined. The conditions under which the extraction unit 12 determines that the shape of the element is similar include a condition under which the type of shape of the element is the same. In addition, a condition is included under which the difference between the dimension of the element in the design information 41 and the dimension of the element in the performance information 31 is within a predetermined determination range. For example, a condition is included under which the difference between one dimension of the element of the performance information 31 and the dimension of the element of the current design information 41 is within ±10%. Alternatively, a condition is included under which the dimensions of the elements of the performance information 31 are within the range of dimensions included in the allowance information 51. Furthermore, when the condition of quality such as surface roughness is included in the design information 41, the condition is included under which the quality of the performance information 31 is higher than the quality included in the design information 41.

For example, when all the above conditions are satisfied, the extraction unit 12 can determine that the shape of the element included in the performance information 31 is similar to the shape of the current element.

In determination of the similarity regarding the material of the workpiece, for example, when the material is the same, the extraction unit 12 can determine the similarity. For example, materials classified into carbon steel materials for machine structure in JIS standards have types such as S10C, S20, and S45C. Here, when the symbols (such as S45C) of the materials match, it can be determined that the materials are the same.

Alternatively, in the case where the material is designated in the design information 41 in the classification of the predetermined standard, when the classification of the standard is the same, it can be determined that the materials are similar. For example, when a carbon steel material for a mechanical structure is designated in the design information 41, and in a case where the symbol of the material included in the performance information 31 is SXXC (XX is any number) of the JIS standard, it can be determined that the material is similar because it is a carbon steel material for a mechanical structure.

Alternatively, when the material is designated by physical property values such as Young's modulus or tensile strength in the design information 41, the physical property values can be determined to be similar if they fall within a predetermined determination range. For example, when the difference between the Young's modulus of the material included in the performance information 31 and the Young's modulus of the workpiece included in the design information 41 is less than a predetermined determination value, it can be determined that the materials are similar.

In the design information 41, the material may be designated by the classification of the standard and the physical property value. For example, the material can be designated like carbon steel materials for machine structure having a tensile strength of 500 MPa or greater and less than 700 MPa.

Figure 12:
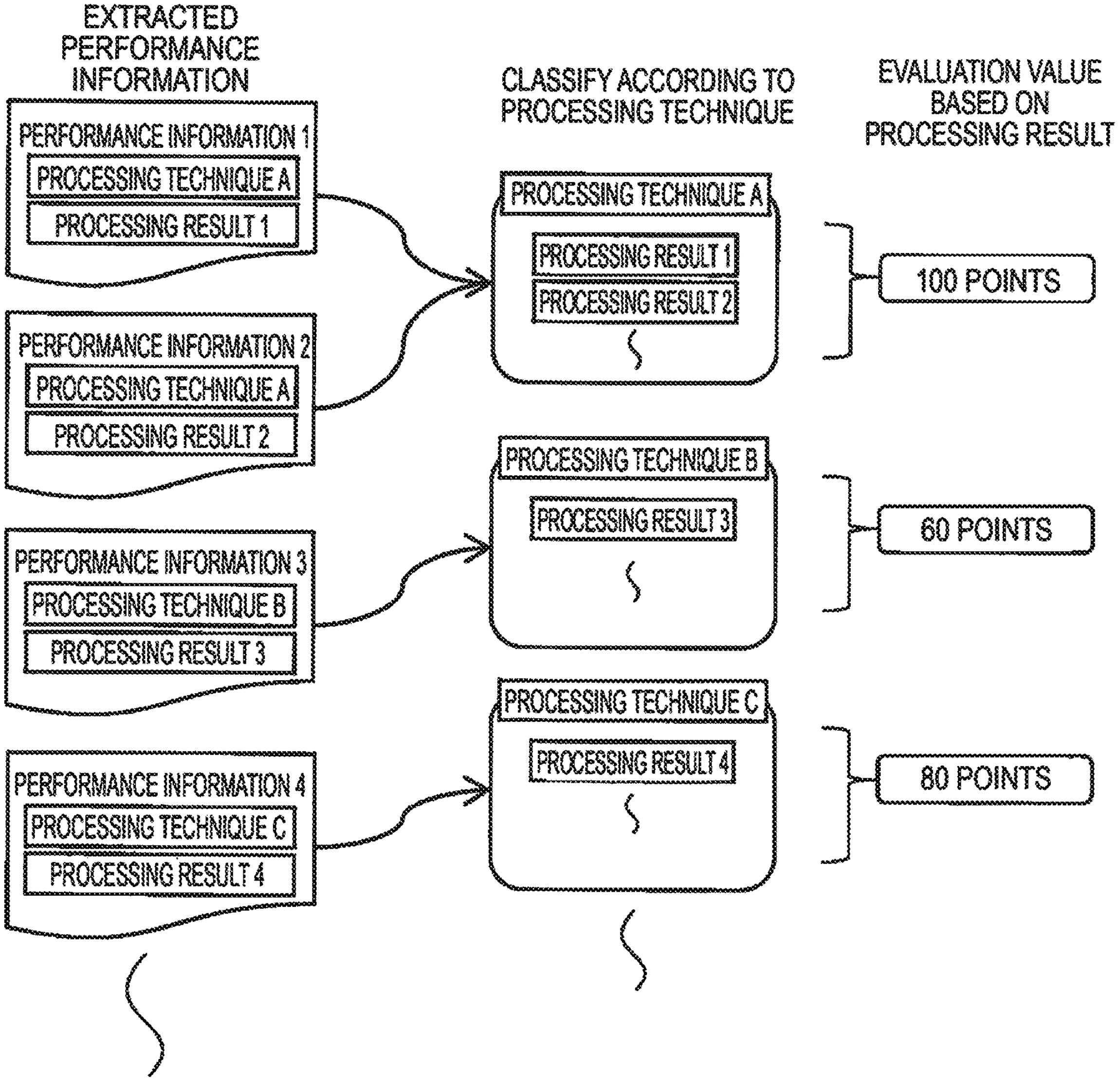
FIG. 12 is an explanatory diagram of functions of a classification unit and an evaluation unit in an embodiment.

FIG. 12 illustrates an explanatory diagram for explaining the functions of the extraction unit, the classification unit, and the evaluation unit. Referring to FIGS. 1, 11 and 12, in step 107, the classification unit 13 classifies the performance information 31 of the elements extracted by the extraction unit 12 for each processing technique. The extraction unit 12 may extract a plurality of pieces of performance information 31. Each of the performance information 31 includes the processing technique information 34 and the processing result information 35. The classification unit 13 sets the performance information of the same processing technique in one group. Then, the processing results are collected for each group. In the present embodiment, the classification unit 13 determines that the same processing technique is used when all items included in the processing technique information 34 match. The control of the classification unit 13 is not limited to this mode, and it may be determined that the processing technique is the same when the predetermined items in the processing technique are the same. As described above, the classification unit 13 can integrate processing results into the respective processing techniques.

Next, in step 108, the evaluation unit 14 evaluates the processing technique classified by the classification unit 13. The evaluation unit 14 is formed to evaluate processing technique on the basis of a predetermined evaluation method and evaluation criteria. Referring to FIG. 12, evaluation unit 14 of the present embodiment calculates an evaluation value for each processing technique. Each processing technique can be evaluated on the basis of the processing result information 35 included in the performance information 31. For example, the evaluation unit 14 can calculate the average value of the processing cost, the average value of the processing time, and the non-defective rate for a plurality of processing techniques. A value obtained by multiplying each item by a weight (coefficient) and adding the multiplied result can be adopted as an evaluation value. Alternatively, a value obtained by multiplying the inverse of each item by a weight (coefficient) and adding the multiplied result may be adopted as the evaluation value.

The weight by which each item is multiplied can be arbitrarily set by the operator. A large weight (coefficient) can be set to an item that the operator considers to be important in the current processing. For example, when the operator considers the quality to be important, a large weight can be set to the item of the non-defective rate.

Alternatively, a weight predetermined by the operator may be used. For example, the operator can predetermine the weight according to the type of processing. The operator can change the weight for each type of processing. At this time, the operator can set the coefficient of item that is important for processing to a large value.

The processing technique with the largest evaluation value can be determined to be the processing technique that is most suitable for the current processing. The evaluation unit 14 can select the processing technique with the best evaluation value on the basis of the processing result. Alternatively, the evaluation unit 14 may select a plurality of processing techniques from processing techniques having high evaluation values. For example, among the processing techniques excellent in evaluation value, a predetermined number of processing techniques may be selected. As described above, the evaluation unit 14 selects a preferred processing technique for processing the current element.

In addition, when a processing technique is selected in step 108, the determination range of the permitted evaluation value may be predetermined. In a case where all the processing techniques of the past deviate from the determination range of the evaluation value, the display unit may display information that there exists no performance information which includes the preferable processing techniques. For example, the operator can predetermine the minimum evaluation value. In a case where the evaluation values of all the processing techniques of the past are less than the minimum value, the display unit may display information that there exists no preferable processing technique in the past.

Moreover, the evaluation unit 14 of the present embodiment is formed so that processing technique may be evaluated on the basis of the predetermined evaluation method and evaluation criteria. The evaluation method can be changed by the operator via the input unit 21. For example, the operator can change the calculation method of the evaluation value by changing the weight. In addition, the evaluation criteria can be changed by the operator via the input unit 21. For example, the operator can set the evaluation criteria so as to select the processing technique with the highest evaluation value, or to select a plurality of processing technologies. By performing this control, it is possible to easily change the evaluation method and evaluation criteria according to the content of processing or the consumer's request.

Next, in step 109, the shape setting unit 15 sets the shape of the element on the basis of the processing technique information 34 selected by the evaluation unit 14. For example, the shape setting unit 15 sets a shape that is determined to be optimal. The shape setting unit 15 sets the dimensions of the portion where the change is permitted. The shape setting unit 15 acquires the allowable shape information 52 of the allowance information 51 from the storage unit 11 (see FIG. 9 and FIG. 10). The shape setting unit 15 acquires a portion where the change in dimension is permitted. When the evaluation unit 14 selects the optimum processing technique, the shape setting unit 15 can set the dimension of the portion where the change is permitted to the dimension included in the performance information 31 corresponding to the processing technique selected by the evaluation unit 14. That is, it is possible to adopt the same dimension as the dimension of the element whose processing result is determined to be the best.

When the evaluation unit 14 selects a plurality of processing techniques, the shape setting unit 15 can adopt the dimension that is most frequently included in the performance information 31 corresponding to the processing techniques. Alternatively, the shape setting unit 15 can adopt an average value of a plurality of dimensions. When a plurality of types of tools are selected for the plurality of processing techniques, the dimensions of the element and tools of the processing techniques with the highest evaluation value can be adopted.

Alternatively, the shape setting unit 15 may set the dimension of the portion where the change is permitted on the basis of the dimension of the tool included in the processing technique information 34. For example, when the evaluation unit 14 selects one processing technique, a tool to be used is determined. The operator can predetermine how to set the dimensions of the element with respect to the dimensions of the tool. For example, a method may be adopted in which the radius of curvature of the corner of the recess matches the radius of the tool.

As described above, the shape setting unit 15 can set the dimension where the evaluation of the processing result is excellent on the basis of the processing technique selected by the evaluation unit 14 within the range of the dimensions of the element included in the allowance information 51.

Next, in step 110, the calculation unit 16 calculates at least one of the time and the cost for processing the workpiece on the basis of the shape of the element and the tool set by the shape setting unit 15. In the calculation of processing time and processing cost, the performance information 31 selected in the evaluation unit 14 can be used. When the shape of the element and the tool of this time are the same as the shape and the tool of the element included in the performance information 31, the processing time and the processing cost included in the performance information 31 can be adopted.

When the shape of the element and the tool of this time are different from the shape of the element and the tool included in the performance information 31, the calculation unit 16 can calculate the processing time and the processing cost on the basis of the performance information 31. For example, when the shape of the current element is different from the shape of the element included in the performance information 31, the calculation unit 16 can calculate the processing time and the processing cost for the processing of the portion having different dimensions. For example, when the length of one side of the current element is 1.1 times the dimension included in the performance information, a value obtained by multiplying the processing time and the processing cost of the performance information by 1.1 can be adopted.

In step 111, the display unit 22 displays the processing technique selected by the evaluation unit 14 and the shape of the element set by the shape setting unit 15. The display unit 22 displays at least one of the processing time and the processing cost calculated by the calculation unit 16. The operator can maintain or change the present design shape and processing technique with reference to the information displayed on the display unit 22. Note that the display unit 22 may display some information among the selected processing technique, the shape of the element set by the shape setting unit 15, the processing time, and the processing cost.

Processing technique information includes the information on the type of machine to be used and the information on the machine component. The operator can determine whether the machine type is changed. The operator can also determine whether the component such as the tool is appropriate. For example, cutting of a workpiece can be performed with a machine tool or a wire electrical discharge machine. When the workpiece is cut, the operator can select a machine to be used by referring to the information displayed on the display unit.

In the configuration of the present embodiment, the shape of the element, the processing technique, the processing cost, and the processing time, set by the arithmetic processing device 5, are displayed on the display unit 22, however, the embodiment is not limited to this and any control can be implemented. For example, the output of the arithmetic processing device 5 may be transmitted to another arithmetic processing device.

In the above embodiment, the example in which the recess is mainly formed in the rectangular parallelepiped workpiece has been described, but the same control can be performed with respect to the hole, so that the machine to be used can be selected and the shape of the element can be set. Furthermore, the control in the present embodiment can be applied to the processing of a workpiece of any shape.

Figure 13:
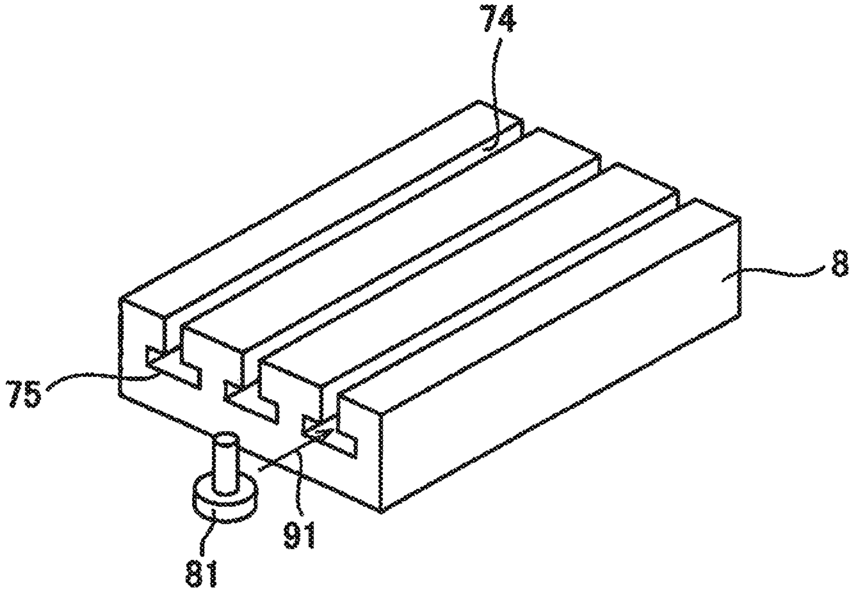
FIG. 13 is a perspective view of a second workpiece in an embodiment.

FIG. 13 illustrates a perspective view of a second workpiece in the present embodiment. In a second workpiece 8, the workpiece 8 is cut by using a milling cutter 81 as a tool. As illustrated by an arrow 91, the milling cutter 81 is moved from one end to the other end of the workpiece 8 so as to form a groove having a vertical groove 74 and a horizontal groove 75. Here, the performance information 31 and the design information 41 when this processing is performed will be described.

Figure 14:
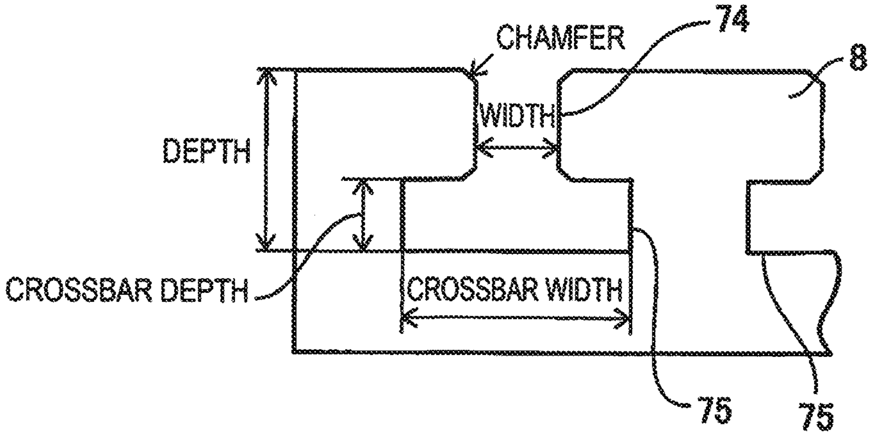
FIG. 14 is a first front view for explaining information, among shape information, related to the dimensions in a second workpiece.

FIG. 14 illustrates a first enlarged front view of a second workpiece in the present embodiment. The workpiece shape information 32, 42 included in the performance information 31 and the design information 41 can include the width of the vertical groove 74, the width of the horizontal groove 75 (crossbar width), and the depth of the horizontal groove 75 (crossbar depth). Furthermore, the workpiece shape information 32, 42 can include a depth from the upper surface of the workpiece to the bottom surface of the horizontal groove 75, a dimension of the chamfer at the corner, or the like.

Figure 15:
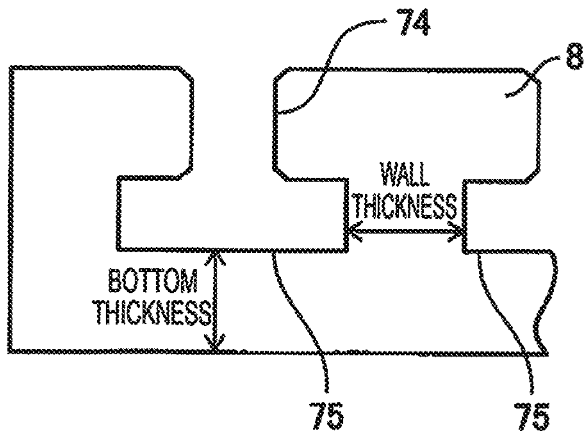
FIG. 15 is a second front view for explaining information, among shape information, related to the dimensions of the periphery of elements in a second workpiece.

FIG. 15 illustrates a second enlarged front view of the second workpiece. The information on the dimensions of the periphery of the element in the workpiece shape information 32, 42 can include the thickness from the horizontal groove 75 to the bottom of the workpiece 8 and the thickness of the wall between the horizontal grooves 75.

Figure 16:
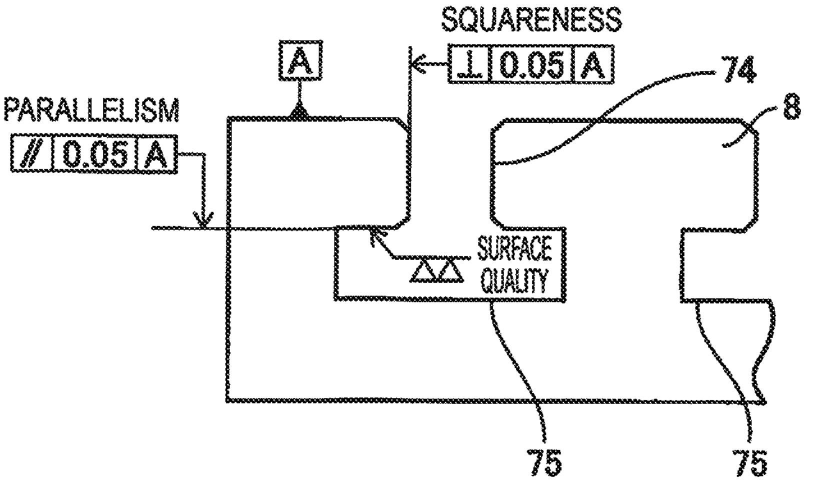
FIG. 16 is a third front view for explaining information, among shape information, related to quality in the second workpiece.

FIG. 16 illustrates a third enlarged front view of the second workpiece. The workpiece quality information can include the surface roughness of the horizontal groove 75, the perpendicularity of the vertical groove 74 with respect to the upper surface of the workpiece 8, and the parallelism of the upper surface of the horizontal groove 75 with respect to the upper surface of the workpiece 8. Thus, the workpiece shape information 32 can be set according to the workpiece to be processed. Further, the workpiece material information 33 can be set according to the workpiece to be processed.

In the above embodiment, the performance information 31 generated by the operator is input to the storage unit 11, but the embodiment is not limited to this. The design support apparatus can be formed to be able to communicate with at least one of a machine that processes a workpiece and an inspection device that inspects the workpiece. The arithmetic processing device can store, in the storage, unit the performance information received from at least one of the machine and the inspection device.

For example, referring to FIG. 1, the design support apparatus 1 is communicably connected to a machine 85 and an inspection device 86. The arithmetic processing device 5 includes the information acquisition unit 18 that acquires at least a portion of the performance information. The information acquisition unit 18 can acquire the workpiece shape information 32, the workpiece material information 33, and the processing technique information 34 regarding the processing of the workpiece actually processed from the control device of the machine 85. In addition, the information acquisition unit 18 can acquire the processing result information 35 from the inspection device 86 that inspects the workpiece after processing. Examples of the inspection device 86 can include a measurement device for measuring the dimensions of a workpiece after processing and a measurement device for measuring surface roughness. The storage unit 11 can automatically store the performance information 31 for each element. With this configuration, it is possible to automatically store the performance information 31 each time the machine processes a workpiece. Even if the operator does not input the performance information 31, it is possible to accumulate past performance information.

Note that the information acquisition unit 18 may acquire partial information of the performance information via the communication device. The operator may input to the input unit 21 the performance information that could not be acquired from the machine 85. In addition, the information acquisition unit 18 may acquire partial information of the processing result from the inspection device 86 via the communication device. The operator may input to the input unit 21 the information that could not be acquired from the inspection device 86.

Figure 17:
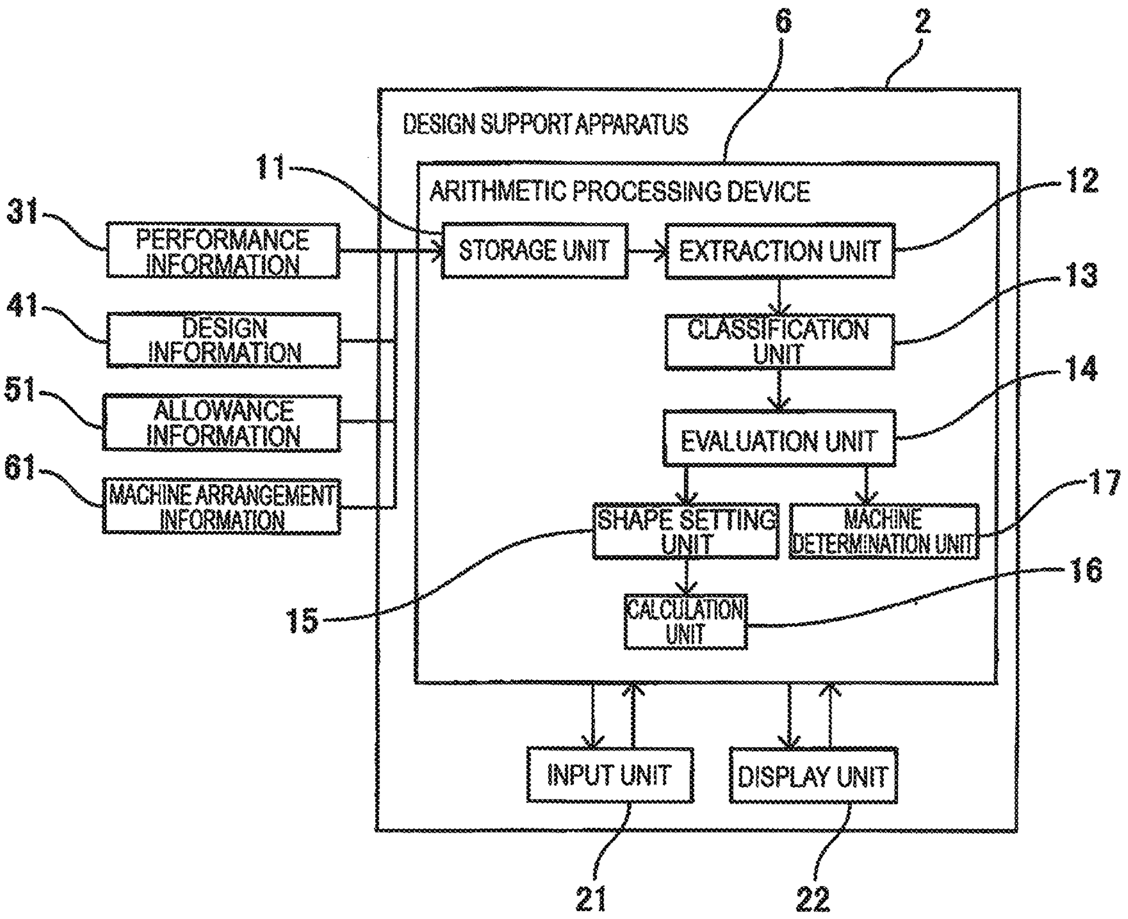
FIG. 17 is a block diagram of a second design support apparatus in an embodiment.

FIG. 17 illustrates a block diagram of a second design support apparatus in the present embodiment. In the second design support apparatus 2, the arithmetic processing device 6 includes a machine determination unit 17 that determines whether a machine capable of processing a workpiece exists in a predetermined area. The machine determination unit 17 corresponds to a processor driven in accordance with the operation program. The processor reads the operation program and performs control defined in the operation program so as to function as the machine determination unit 17.

Further, machine arrangement information 61 including information of a machine existing in an area predetermined by the operator is input to the arithmetic processing device 6. The storage unit 11 functions as a machine information storage unit that stores the machine arrangement information 61. As an area defined by the operator, for example, it is possible to set an area within one factory or within a factory site including a warehouse. Here, a factory is illustrated and explained as a predetermined area.

Figure 18:
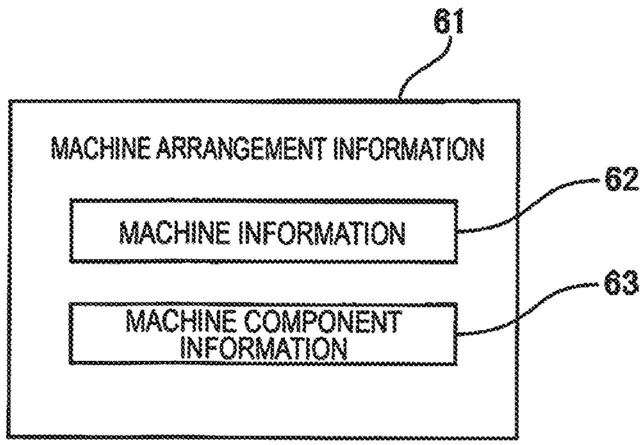
FIG. 18 is an explanatory diagram of machine arrangement information in an embodiment.

FIG. 18 is an explanatory diagram of the machine arrangement information. The machine arrangement information 61 includes machine information 62. The machine information 62 includes the type of machine. The type of machine may include a machine tool, an electrical discharge machine, a laser processing machine, a press machine, and a three-dimensional printing machine. Machine information 62 includes, for each machine, the type of processing method and the range in which processing is possible. The type of processing method includes cutting, machining, and drilling. For example, in the case of a machine tool, machining and drilling can be performed. Examples of a range which can be processed include a range of size of a workpiece which can be held by a machine, a material of a workpiece which can be machined by a machine, a stroke of a feed shaft, or the like.

The machine information 62 may include the range of the processing conditions described above. Example of the range of processing condition includes a range of the speed of the tool with respect to the workpiece, or the like. The machine information 62 also includes information on components that can be attached to the machine. For example, machine information 62 includes the type and the diameter of a tool that can be attached to the machine.

The machine arrangement information 61 includes machine component information 63. When the machine is a machine tool or a lathe, the component information 63 may include tool information, tool length, tool diameter, and tool material. When the machine is a wire electrical discharge machine, the component information 63 may include the diameter of the wire, the material of the wire, or the like.

Referring to FIGS. 17 and 18, the machine determination unit 17 determines, on the basis of the machine arrangement information 61, whether a machine existing in the factory can process a workpiece to a design shape specified by the design information 41. That is, the machine determination unit 17 determines whether a machine capable of processing the element designed this time exists in a predetermined area. For example, when a cylindrical hole is formed, the machine determination unit 17 determines whether a machine tool or a lathe exists in the factory. The machine determination unit 17 determines whether there exists a tool such as a drill or a reamer having a diameter corresponding to the hole. The machine determination unit 17 determines whether the length of the tool is longer than the depth of the hole. The machine determination unit 17 determines whether the tool corresponding to the hole can be held by the machine tool or the lathe. As described above, the machine determination unit 17 determines whether processing is possible with a machine in the factory on the basis of the design shape. The display unit 22 can display the determination result by the machine determination unit 17.

The machine determination unit 17 may determine whether processing is possible with a machine in the factory on the basis of the allowable shape. That is, the machine determination unit 17 can change the dimensions in the portion in which the change in dimension is allowed within the allowable range, and determines whether processing can be performed by the machine existing in the predetermined area.

Figure 19:
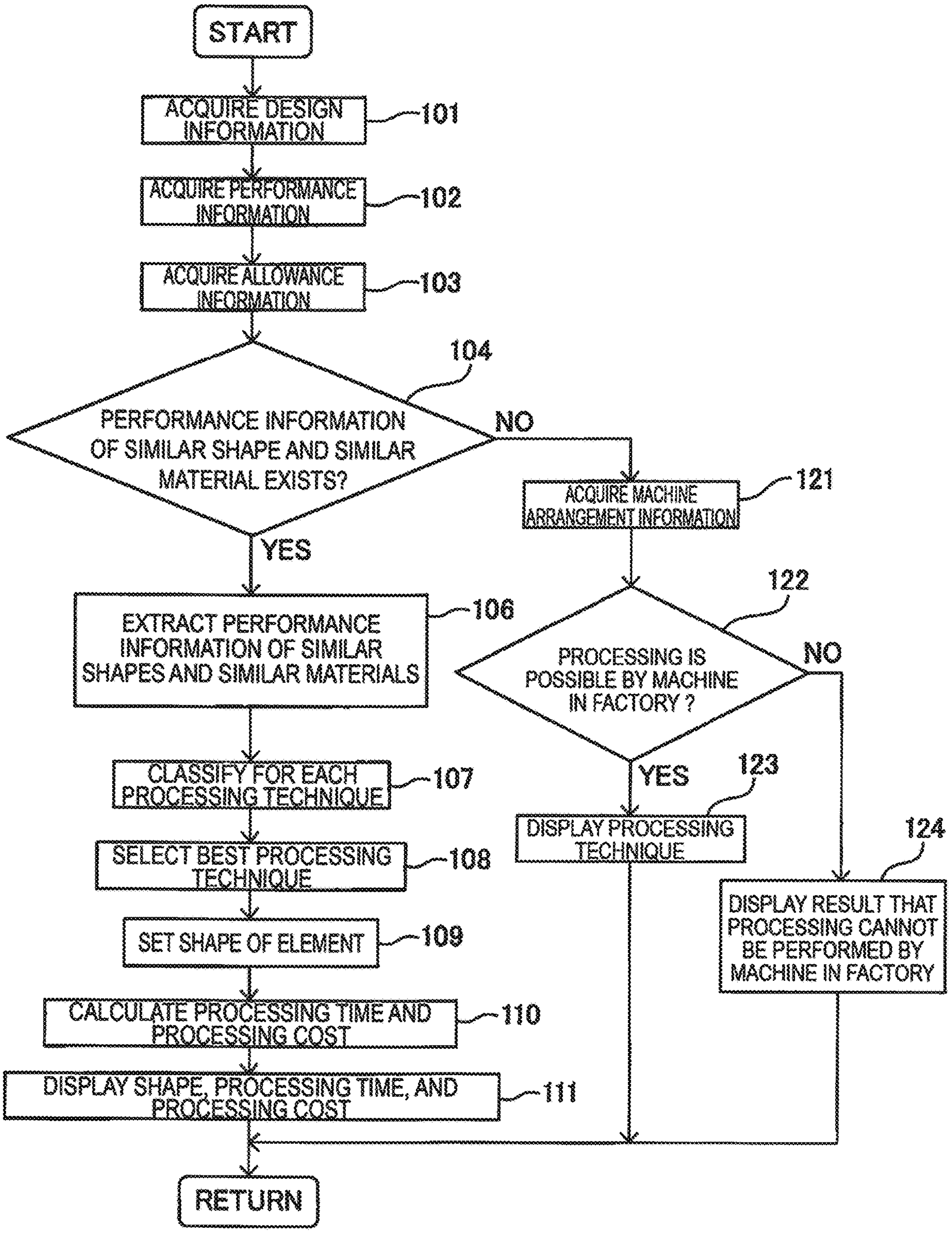
FIG. 19 is a flow chart of a second control in an embodiment.

FIG. 19 illustrates a flow chart of a second control in the present embodiment. Referring to FIGS. 17 and 19, steps 101 to 104 are similar to the first control in the present embodiment (see FIG. 11). In step 104, the extraction unit 12 determines whether there exists the performance information 31 including the shape of the element and the material of the workpiece similar to the design information 41. In step 104, when there exists no performance information similar to information on the shape of the element and the material of the workpiece included in the design information 41, the control proceeds to step 121. In step 121, the machine determination unit 17 acquires the machine arrangement information 61 from the storage unit 11.

In step 122, the machine determination unit 17 determines whether the element can be processed into a design shape by a machine in the factory. In step 122, when the machine in the factory can process, the control proceeds to step 123. In step 123, the display unit 22 displays the processing technique. That is, the processing method, the type of machine that can process, the type of tool, processing conditions, or the like are displayed.

In step 122, when the machine in the factory cannot process, the control proceeds to step 124. In step 124, the display unit 22 displays the result that the machine existing in the factory cannot process.

In step 104, when there exists performance information similar to information on the shape of the element and the material of the workpiece included in the design information 41, the control proceeds to step 106. The control from step 106 to 111 is the same as the first control in the present embodiment (see FIG. 11).

In the second control, when there exists no processing information similar to the current processing in the performance information, it is determined whether the workpiece can be processed by a machine existing in a predetermined area. The operator can know, for example, whether the processing of the current workpiece is possible by a machine arranged in the factory.

Figure 20:
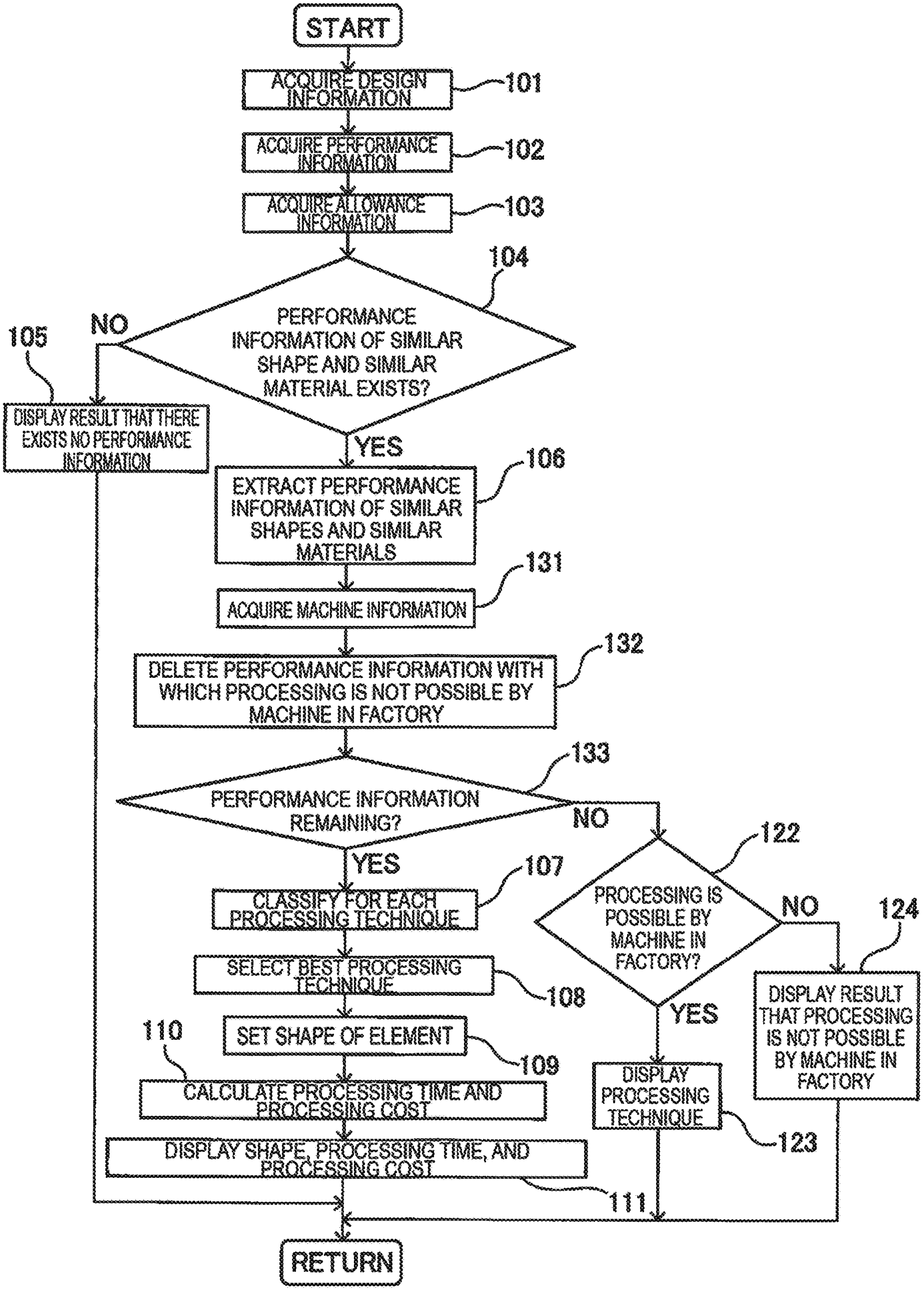
FIG. 20 is a flow chart of a third control in an embodiment.

FIG. 20 illustrates a flow chart of a third control in the present embodiment. Steps 101 to 106 are the same as the first control in the present embodiment (see FIG. 11). When the extraction unit 12 extracts the performance information 31 including the shape of the element and the material of the workpiece similar to the design information 41 in step 106, the control proceeds to step 131.

In step 131, the machine determination unit 17 acquires the machine arrangement information 61 from the storage unit 11. In step 132, the machine determination unit 17 deletes the performance information 31 with which processing is not possible by the machine existing in the factory. The performance information 31 is information in which the processing was actually performed in the past. However, even machines that were present in the factory in the past may not exist in the factory at present. Alternatively, even if the same or similar machine exists in the factory, there may exist no machine component. For example, there may be a case where the tool included in the performance information 31 does not exist. In such a case, the machine determination unit 17 deletes the performance information with which processing is not possible by the machine existing in the factory.

Next, in step 133, the machine determination unit 17 determines whether there remains the performance information 31 with which processing is possible by the machine existing in the factory. In a case where there remains the performance information 31 with which processing is possible by the machine existing in the factory, the control proceeds to step 107. On the other hand, when there remains no performance information 31 with which processing is possible by the machine existing in the factory, the control proceeds to step 122. That is, when all the processing technique of the performance information 31 extracted by the extraction unit 12 cannot be implemented, the control proceeds to step 122.

Steps 122 to 124 are similar to the second control in the present embodiment (see FIG. 19). That is, in step 122, it is determined whether the workpiece can be processed by a machine in the factory on the basis of the design information. When the current workpiece can be processed by a machine in the factory, the control proceeds to step 123. Then, the display unit 22 displays the processing technique. In step 122, when the machine in the factory cannot process, the control proceeds to step 124. In step 124, the display unit 22 displays the result that the workpiece cannot be processed by the machine existing in the present factory.

As described above, even when the processing of a workpiece has a past performance record, there exists a case where a machine or a machine component necessary for the processing does not exist. In the third control, it can be determined whether the element of the workpiece can be processed by a method that is not included in the performance information. Then, the determination result can be notified to the operator.

In the present embodiment, the performance information 31, the design information 41, the allowance information 51, and the machine arrangement information 61 are stored in one storage unit 11 disposed inside the arithmetic processing device 5, but the embodiment is not limited to this. They may be stored in a plurality of storage units that store the respective information. Alternatively, they may be stored in a storage unit connected to the arithmetic processing device via a communication line. For example, the above information may be stored in a storage unit of another arithmetic processing device connected to the arithmetic processing device via a network.

According to one aspect of the present disclosure, it is possible to provide a design support apparatus that supports selection of a machine used for processing and setting of the shape of a workpiece.

In each control described above, the order of the steps can be changed as appropriate as long as the function and the effect are not changed.

The above embodiments can be combined as appropriate. In each of the above figures, the same or equivalent parts are denoted by the same reference numerals. Note that the above-described embodiments are merely examples and are not intended to limit the invention. Further, in the embodiments, modifications of the embodiment described in the claims are included.

The invention claimed is:

1. A design support apparatus, comprising:

a memory storing:

(i) performance information of past processing of a workpiece, wherein the performance information includes, for each element of the workpiece, (a) information of a shape and a material of the workpiece, (b) processing technique information including a plurality of processing techniques for processing the workpiece, and (c) processing result information including processing results of the plurality of processing techniques, (ii) design information including a design shape and a material of a current workpiece, (iii) allowance information including allowable shape information by which a change in dimension is permitted to the design shape of the current workpiece, and (iv) machine arrangement information including information of machines existing in a predetermined area;

a display configured to display information related to a processing of the current workpiece; and a processor configured to:

extract the design information of the current workpiece, the performance information of the workpiece, and the allowance information of the current workpiece, evaluate the performance information to determine whether the performance information includes (i) a similar shape of an element of the workpiece to the design shape of an element of the current workpiece in the design information and (ii) a similar material of the workpiece to the material of the current workpiece in the design information, wherein a determination of similarity, regarding whether the performance information includes (i) the similar shape of the element of the workpiece to the design shape of the element of the current workpiece in the design information and (ii) the similar material of the workpiece to the material of the current workpiece in the design information, is predetermined, in response to determining that the performance information includes (i) the similar shape of the element of the workpiece to the design shape of the element of the current workpiece in the design information and (ii) the similar material of the workpiece to the material of the current workpiece in the design information, extract the performance information including the similar shape of the element of the workpiece to the design shape of the element of the current workpiece and the similar material of the workpiece to the material of the current workpiece, extract the machine arrangement information, and determine whether the performance information includes, among the plurality of processing techniques, at least one processing technique with which the processing of the current workpiece into the design shape of the element of the current workpiece is possible by the machines, in response to determining that the performance information does not include said at least one processing technique, determine whether the machines are capable of processing the current workpiece into the design shape of the element of the current workpiece, in response to determining that the machines are not capable of processing the current workpiece into the design shape of the element of the current workpiece, cause the display to display a result that the current workpiece cannot be processed by the machines, and in response to determining that the performance information includes said at least one processing technique, classify said at least one processing technique in the performance information by extracting the processing technique information and the processing result information of said at least one processing technique, setting same processing technique of said at least one processing technique in one group, wherein the same processing technique is determined to be used when all items included in the processing technique information match, and collecting a processing result for each group, evaluate said at least one processing technique by calculating an evaluation value for said at least one processing technique based on the processing result for each group, and select a processing technique among said at least one processing technique based on the evaluation value, wherein among the machines existing in the predetermined area, a machine corresponding to the selected processing technique performs the processing of the current workpiece.

2. The design support apparatus according to claim 1, further comprising:

an input unit configured to receive, from an operator, further information related to the processing of the current workpiece, wherein the processor is configured to evaluate said at least one processing technique based on a predetermined evaluation method and evaluation criteria, the predetermined evaluation method and the evaluation criteria are changeable by the operator via the input unit, and the display is configured to, in response to the processor determining that there exists no processing technique in which the evaluation criteria is satisfied, display information that there exists no past processing technique in which the evaluation criteria is satisfied.

3. The design support apparatus according to claim 1, wherein the processor is configured to calculate at least one of time and cost for processing the element of the current workpiece into a set shape based on the performance information, and the display is configured to display at least one of the time and the cost.

4. The design support apparatus according to claim 1, wherein the design support apparatus is communicably connected to at least one of the machine of the machines, and an inspection device configured to inspect the current workpiece, and the processor is configured to acquire at least a portion of the performance information, and the memory stores the performance information acquired from at least one of the machine and the inspection device.

5. The design support apparatus according to claim 1, wherein the processor is configured to, in response to determining that the machines are capable of processing the current workpiece into the design shape of the element of the current work-piece, cause the display to display said at least one processing technique with which the processing of the current workpiece into the design shape of the element of the current workpiece is possible by the machines.

6. The design support apparatus according to claim 1, wherein the processor is further configured to instruct the machine corresponding to the selected processing technique to perform the processing of the current workpiece.

* * * * *